United States Patent [19]

Couchoud

[11] 4,061,615
[45] Dec. 6, 1977

[54] SHAPED POLYESTER ARTICLES HAVING GOOD FLAME RESISTANCE AND PROCESS FOR THE PRODUCTION THEREOF

[75] Inventor: Paul Couchoud, Dardilly, France

[73] Assignee: Rhone-Poulenc-Textile, France

[21] Appl. No.: 642,904

[22] Filed: Dec. 22, 1975

[30] Foreign Application Priority Data

Dec. 26, 1974    France .............................. 74.43220

[51] Int. Cl.$^2$ ............................................ C08G 51/62
[52] U.S. Cl. .......................... 260/45.7 P; 260/75 P; 260/75 T; 260/860; 260/DIG. 24; 428/272; 428/289; 428/480; 428/481; 428/920; 427/390 D
[58] Field of Search ............... 428/272, 289, 480, 481, 428/920; 260/860, 75 P, 45.7 P, 75 T, DIG. 24; 427/390 D

[56] References Cited

U.S. PATENT DOCUMENTS

| | | | |
|---|---|---|---|
| 3,927,231 | 12/1975 | Desitter et al. ...................... | 428/480 |
| 3,928,283 | 12/1975 | Masai ................................ | 260/75 P |

*Primary Examiner*—Ellis Robinson
*Attorney, Agent, or Firm*—Stevens, Davis, Miller & Mosher

[57] ABSTRACT

The present invention relates to shaped polyester articles which have good flame resistance. These articles comprise a polymethylene copolyester containing 60 to 95 mol % of terephthalate units and 5 to 40 mol % of isophthalate units and they contain 2 to 40% by weight of a phosphorus and/or halogen compound.

They are employed in the textile industry and, in particular, in the furniture industry as well as in plastic films and materials for the building industry.

7 Claims, No Drawings

SHAPED POLYESTER ARTICLES HAVING GOOD FLAME RESISTANCE AND PROCESS FOR THE PRODUCTION THEREOF

The present invention relates to shaped articles of polyesters such as plastic textile articles, films and the like which have good flame resistance.

From French Pat. No. 2,081,803 a non-inflammable thermoplastic polyester composition is known which contains a fireproofing agent such as, for instance, a hydroquinone polyphenylphosphonate.

From Japanese Patent Application 41,696/71 there is also known a composition of low combustibility which comprises an organic polymer which may be a polyester containing a fireproofing agent such as, for instance, monobromohydroquinone polyphenylphosphonate.

It is also known from French Pat. Nos. 2,219,193 and 2,238,710 to use either products of the type of dibromoneopentylgylcol polyphenylphosphonates or products of the phosphine oxide type for the flameproofing of the polyesters.

Finally, it is known from French Patent 2,158,473 to produce flame retardant polyester molding compositions containing a compound of phosphorus.

The products mentioned in said patents substantially decrease the combustibility of the polyesters in particular of articles of polyethylene terephthalate, but this decrease in combustibility is at times still insufficient for certain uses in which the requirement of non-inflammability is very great. Furthermore, the use of these products, in particular the bromine products in the polymers, frequently leads to a change in the properties of the articles obtained, such as yellowing.

The present invention concerns shaped articles of polyesters which have good resistance to flame, which are characterized by the fact that they are formed of a polymethylene copolyester containing 60 to 95 mol % of terephthalate units and 5 to 40 mol % of isophthalate units and that they contain 2 to 40% by weight of a phosphorus and/or halogen compound.

The invention also concerns a process for obtaining such articles which is characterized by preparing a di- or tetramethylene terephthalate copolymer containing 5 to 40 mol % of isophthalate, 60 to 95 mol % of terephthalate units of the same diol and incorporating, in said copolymer, 2 to 40% by weight, referred to the copolymer, of a phosphorus and/or halogen compound either before, during, or after the shaping thereof.

As phosphorus and/or halogen compound which can be employed in accordance with the present invention, mention may be made of 1,3-bis (diphenylphosphinoxide) 2,2-di(bromomethyl) propane dibromoneopentylglycol polyphenylphosphonate and, in particular, hydroquinone polyphenylphosphonate and monobromohydroquinone polyphenylphosphonate.

The molecular weight of the polyphenylphosphonates which can be used is not critical, but it is generally preferred to employ polyphenylphosphonates of a specific viscosity of at least 0.10, measured on the basis of a 1% solution in dimethylformamide. Thus, the dibromoneopentylglycol polyphenylphosphonate may have 3 or 4 recurrent units while the last two polyphenylphosphonates may have a degree of polymerization of 20-25.

The best mol percentage of isophthalate units for the carrying out of the invention varies with the nature of the diol included in the composition of the polyester.

Thus, when it is desired to obtain a fireproof article having a base of dimethylene polyterephthalate it is generally preferable to form a copolymer with 5 to 20 mol % of isophthalate units. In fact, a larger proportion of isophthalate units would not result in a much greater improvement and this would be to the detriment of the other properties.

On the other hand, when it is desired to obtain a fireproof article having a base of tetramethylene polyterephthalate it is generally preferably to form a copolymer having at least 10 mol % and preferably 20 to 40 mol % of isophthalate units in order to obtain a substantial increase in the resistance to fire.

It is particularly surprising that the application of a phosphorus or halogen fireproofing agent to articles of terephthalate/isophthalate copolymer leads to better fireproofing than the application of these same fireproofing agents to articles of homopolymeric polyterephthalate. There is concerned here an action similar to that of a synergism between the fireproofing agent and the copolymer, which was totally unforeseeable.

This increased effectiveness makes it possible in particular to use a smaller quantity of fireproofing agent in the copolyesters than in homopolyesters to obtain a similar result, which is both of great economic and great technical importance. As a matter of fact, the incorporating of a substantial amount of another substance in a polymer is still a source of technical difficulty in particular with regard to the shaping thereof and leads to articles of poorer mechanical properties. Furthermore, it is known that the presence of a phenol and/or a halogen and particularly a bromine compound in a yarn is generally not desired because of yellowing or the possiblility of the liberating of noxious vapors upon contact with a flame. Finally, the phosphorus products are costly. The synergistic effect discovered in accordace with the present invention between the fireproofing agent and the copolyester therefore makes it possible to obtain a better result with an identical quantity of fireproofing agent or to use a smaller quantity of fireproofing agent or a less halogenated fireproofing agent in order to obtain a similar fireproofing effect with easier shaping and better final products.

Thus, it is possible to obtain a threshold of effectiveness (that is to say the minimum quantity of product fixed in order that the sample is not completely destroyed in the ex test AATCC 34-1969) of about 13% hydroquinone polyphenylphosphonate for a dimethylene terephthalate/isophthalate copolymer having a ratio of 88:12 in mols, while the threshold of effectiveness of this product is greater than 17% in the case of homopolymeric dimethylene polyterephthalate.

On the other hand, the thresholds of effectiveness of very effective products such as dibromoneopentylglycol polyphenylphosphonate on the copolyesters and homopolymeric dimethylene polyterephthalate are at times much closer, as can be noted from the examples.

In accordance with the process of the invention, the fireproofing agent can be mixed with the mass of molten polymer, for instance, in an extruder before its extrusion in the form of filaments, strands or films. The fireproofing agent may also be applied, in the form of solution, in a solvent such as methanol, acetone, trichlorethylene, etc., by impregnating the finished or semi-finished textile articles such as threads, fibers, strands, fabrics, knitted goods, clothing, etc., with the solution, which impregnation may be followed by a heat treatment either dry or with steam. However, in this latter case the resistance of the fireproofing agent to laundering is not as good.

The following examples in which, unless otherwise indicated, the parts and percentages are by weight, are given by way of illustration and not of limitation in order to illustrate the invention.

In these examples:

The height-destroyed and number of ignited drop tests are carried out in accordance with ex test AATCC 34-69;

the limit oxygen index LOI is determined in accordance with ASTM standard B 2863-70 relative to plastic test pieces, modified and adapted to textile samples of a size of 5 × 16 cm mounted on a rectangular frame;

the intrinsic viscosity is measured on the basis of a solution of 1% weight by volume in orthochlorophenol at 25° C;

the viscosity index of the polymer is determined on the basis of this same solution by means of the following formula:

$$IV = \frac{\text{specific viscosity}}{\text{concentration}} \times 1000$$

in which the concentration is expressed in grams of polymer per 100 cc of solution.

EXAMPLE 1 to 3

12%, with reference to the polymer, of powdered monobromohydroquinone polyphenylphosphonate is introduced by mixing into the following polymers:

Control: Dimethylene polyterephthalate of an intrinsic viscosity of 0.65;

Example 1: Dimethylene terephthalate/isophthalate copolymer in mol proportions of 92:8, of a viscosity index of 810, melt viscosity at 290° C of 2,450 poises and softening point of 244° C;

Example 2: Dimethylene terephthalate/isophthalate copolymer in mol proportions of 88:12, a viscosity index of 825, melt viscosity at 290° C of 2,320 poises and softening point of 231.6° C;

Example 3: Dimethylene terephthalate/isophthalate copolymer in mol proportions of 80:20, viscosity index of 820, melt viscosity at 290° C of 2,100 poises and softening point of 216° C.

These different polymers are extruded through a spinnerette having 23 orifices of 0.34 mm diameter and the yarns are wound up at 500 m/minute. They are then stretched over a finger at 80° C and a plate at 70° C in the case of the control and finger at 70° C, and plate at 80° C in the case of Examples 1 to 3 and at rates of 4.5 for the control, 4.3 for Examples 1 and 2 and 3.2 for Example 3.

The characteristics of the yarns thus obtained are tabulated below. The fire properties were examined on knitted material after desizing, after 20 washings, and after dry cleaning with perchlorethylene at 35° C for one hour.

| Example No. | Control | 1 | 2 | 3 |
|---|---|---|---|---|
| Size in dtex | 62 | 84 | 82 | 88 |
| Tenacity in g/tex | 30 | 36 | 38.8 | 27.3 |
| Elongation % | 20 | 18 | 14 | 17.2 |
| Weight/m² of the knitted material examined | 150 doubled | 200 doubled | 200 doubled | 450 |
| After desizing: | | | | |
| LOI | 29.2 | 31.5 | 32.5 | 36.1 |
| Height destroyed in cm | 10 | 5 | 6 | 7.5 |
| No. of drops ignited | 0 | 0 | 0 | 0 |
| After 20 washings: | | | | |
| LOI | 29.2 | 28.2 | 26.3 | 38 |
| Height destroyed in cm | 25 | 7 | 6 | 8 |
| No. of drops ignited | 0 | 0 | 0 | 0 |
| After dry cleaning: | | | | |
| LOI | 26.5 | 32 | 33 | 41 |
| Height destroyed in cm | 10 | 10 | 6 | 5 |
| No. of drops ignited | 0 | 0 | 0 | 0 |

EXAMPLES 4 AND 5

The copolymer of Example 2, but containing 20 or 25% monobromohydroquinone polyphenylphosphonate is spun as previously.

The fire properties of the two types of yarns obtained examined on a knitted fabric 200 g/m² used double are as follows:

| Examples: | | |
|---|---|---|
| % fireproofing agent | 20 | 25 |
| After desizing: | | |
| LOI | 26.5 | 33.8 |
| Height destroyed in cm | 5 | 4 |
| No. of drops ignited | 0 | 0 |
| After 20 washings: | | |
| LOI | | 31.9 |
| Height destroyed in cm | 6 | 9 |
| No. of drops ignited | 0 | 0 |
| After dry cleaning: | 4 | 5 |
| LOI | | 30.3 |
| Height destroyed in cm | | 6.5 |
| No. of drops ignited | | 0 |

EXAMPLE 6

12% powdered monobromohydroquinone polyphenylphosphonate, with reference to the polymer, is introduced by mixing into:

A tetramethylene polyterephthalate of a viscosity index of 1100, melt viscosity at 260° C of 3,000 poises and softening point of 226° C, as control A;

a tetramethylene terephthalate/isophthalate copolymer in a molar proportion of 80:20, a viscosity index of 1095, melt viscosity at 260° C of 3,410 poises and softening point of 193° C.

These polymers are extruded under the following conditions

| Spinnerette: | Temperature | 272° C | 257° C |
|---|---|---|---|
| | Pressure | 115 bars | 60 bars |
| | No. of apertures | 23 | 23 |
| | Diameter of apertures | 0.8 mm | 0.34 mm |
| | Speed of take-up | 500 m/min | 500 m/min |
| Drawing: | Rate | 3.1 | 3 |
| | Temperature of finger | 70° C | 70° C |
| | Temperature of the plate | 110° C | 80° C |
| | Speed of take-up | 400 m/min | 80 m/min |

As control B the copolymer is also extruded under the above conditions, but without fireproofing agent.

The threads thus obtained are knitted and the resultant knitted fabrics examined in accordance with ex test AATCC 34/1969.

The results are as follows:

|  |  | Knitted fabric examined | Height destroyed |
|---|---|---|---|
| Control A: | homopolymer + fireproofing agent | 150 g/m² doubled | 25 cm |
| Example 6: | copolymer + fireproofing agent | 200 g/m² doubled | 13 cm |
| Control B: | copolymer without fireproofing agent | " | 26 cm |

The fireproofing agent is therefore seen to be effective on the copolymer since only half of the sample is burned while it is only very slightly effective on the homopolymer where practically all of the sample is burned. The non-firproofed copolymer sample burns completely.

EXAMPLE 7

A tetramethylene terephthalate/isophthalate copolymer in a molar proportion of 65:35 having a viscosity index of 1110, a melt viscosity at 260° C of 2,400 poises and a softening point of 163° C is extruded through a spinnerette having 23 apertures of 0.34 mm diameter at 229° C, under a pressure of 140 bars. The yarn is taken up at 500 m/min and then stretched at a rate of 2.6 over a finger at 70° C and a plate at 80° C.

The yarn obtained is knitted in the form of a jersey of 200 g/m².

A part of this jersey is impregnated with a solution of 1,3-bis(diphenylphosphinoxide) 2,2-di(bromomethyl)-propane in methanol, then dried at 80° C and fixed at 210° C.

Thus, 11% by weight of product is fixed on the jersey.

The examination of this sample as well as of the non-fireproofed sample gives the following results.

|  | Non-fireproofed Control | Fireproofed sample |
|---|---|---|
| LOI | 22.8 | 24.5 |
| Height destroyed in cm | 26 | 7 |
| No. of drops ignited | >40 | 0 |

EXAMPLES 8 AND 9

Two knitted fabrics are impregnated:
One of dimethylene polyterephthalate as control;
the other of terephthalate/isophthalate copolymer in a molar proportion of 88:12, identical to that of Example 2 with a solution at various concentrations of hydroquinone polyphenylphosphonate (Example 8) or a solution in various concentrations of monobromohydroquinone polyphenylphosphonate (Example 9).

By examination of the fire resistant properties of the articles obtained, the threshold of effectivess of these two products on each of these polymers is determined, that is to say the minimum quantity of product fixed in order that the sample is not completely destroyed in the ex test AATCC 34/1969. The thresholds obtained are as follows:

|  | Homopolymer control | Compolymer |
|---|---|---|
| Knitted material examined | 130 g/m² doubled | 200 g/m² doubled |
| Example 8 threshold | 20% | 13–15% |
| Example 9 threshold | 12% | 10% |

EXAMPLE 10

Two knitted fabrics are impregnated:
One of 130 g/m² doubled of dimethylene polyterephthalate as control;
the other of 450 g/m² single thickness of dimethyleneterephthalate/isophthalate copolymer in a molar proportion of 80:20, similar to that of Example 3, with a solution at different concentrations of dibromoneopentylglycol polyphenylphosphonate. As in Examples 8 and 9, the threshold of effectiveness of this product is determined on each of these polymers by means of ex test AATCC 34/1969. The thresholds obtained are as follows:

| Control homopolymer | Copolymer |
|---|---|
| 6–7% | 3–6% |

Two knitted fabrics are impregnated:
One with tetramethylene polyterephthalate as control;
the other of terephthalate/isophthalate copolymer in a molar proportion of 65:35, similar to that of Example 7.

As in the three preceeding examples, the threshold of effectiveness of 1,3-bis(diphenylphosphinoxide) 2,2(dibromomethyl) propane is determined. The results are as follows:

| Control | Copolymer |
|---|---|
| 10–11% | about 8% |

What is claimed is:

1. Shaped articles of polyester of good resistance to flame comprising a polymethylene copolyester containing 60–95 mol % of terephthalate units and 5 to 40 mol % of isophthalate units and containing a fireproofing effective amount of 1,3-bis(diphenylphosphinoxide) 2,2 di(bromomethyl)propane or hydroquinone polyphenylphosphonate or monobromohydroquinone polyphenylphosphonate.

2. Articles according to claim 1, wherein said copolyester contains 80–95 mol % of dimethylene terephthalate units and 5 to 20 mol % of dimethylene isophthalate units.

3. Articles according to claim 1, wherein said copolyester contains 60–80 mol % of tetramethylene terephthalate units and 20–40 % of tetramethylene isophthalate units.

4. A shaped article according to claim 1 containing about 8 to 40% by weight of 1,3-bis(diphenylphosphinoxide) 2,2 di (bromomethyl)propane.

5. A shaped article according to claim 1 containing 13 to 40% by weight of hydroquinone polyphenylphosphonate.

6. A shaped article according to claim 1 containing 10 to 40% by weight of monobromohydroquinone polyphenylphosphonate.

7. Process of obtaining polyester articles of good flame resistance, characterized by preparing a di- or tetramethylene terephthalate copolymer containing 5 to 40 mol % of isophthalate units and 60–95 mol % of terephthalate units of the same diol and incorporating with said polymer a fireproofing effective amount of 1,3-bis(diphenylphosphinoxide) 2,2 di(bromomethyl) propane or hydroquinone polyphenylphosphonate or monobromohydroquinone polyphenylphosphonate.

* * * * *